UNITED STATES PATENT OFFICE.

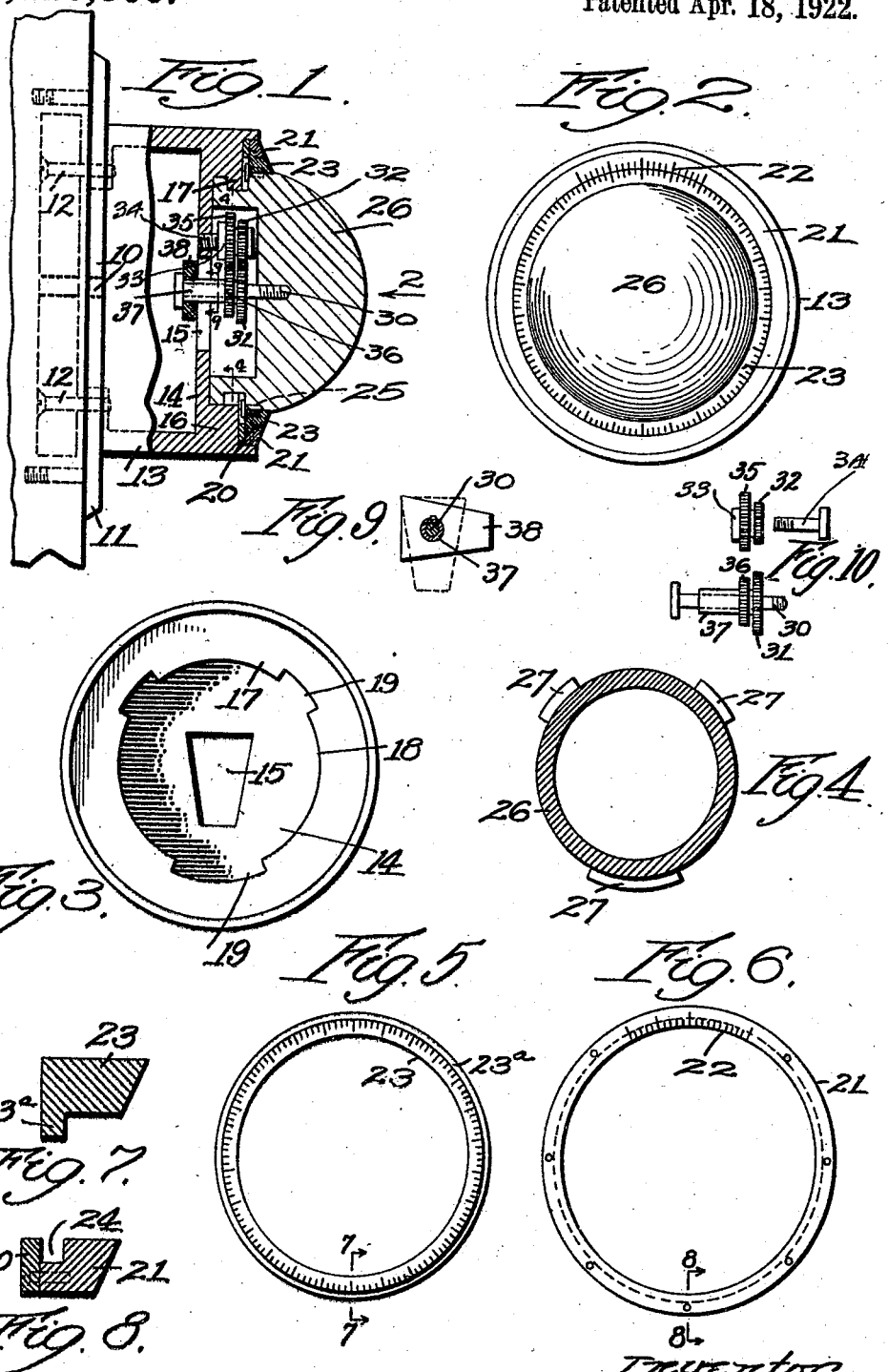

JOHN G. STOLPE, OF WORCESTER, MASSACHUSETTS.

KEYHOLE GUARD.

1,413,300.  Specification of Letters Patent.  Patented Apr. 18, 1922.

Application filed September 2, 1919. Serial No. 321,059.

*To all whom it may concern:*

Be it known that I, JOHN G. STOLPE, a subject of the King of Sweden, residing at Worcester, in the county of Worcester and State of Massachusetts, have invented a new and useful Keyhole Guard, of which the following is a specification.

This invention relates to a guard for covering the key-hole of a lock for any kind of a door but particularly adapted for locking automobiles.

The principal objects of the invention are to provide a simple construction which will cover the key-hole in such a way that it can not be tampered with or entered and yet will be easily opened by the owner; and to combine it with a scale to indicate to the owner the position in which it can be opened; also to provide a construction of this character which will be simple and of such nature that it will not easily get out of order and will protect the parts so that they will not be injured by the weather.

Further objects and advantages of the invention will appear hereinafter.

Reference is to be had to the accompanying drawings, in which—

Fig. 1 is a central sectional view of a preferred form of this invention;

Fig. 2 is a front elevation of the same;

Fig. 3 is an elevation of the casing with the locking element removed;

Fig. 4 is a sectional view on the line 4—4 of Fig. 1;

Fig. 5 is an elevation of one of the scale rings;

Fig. 6 is a similar view of the ring that cooperates with it;

Fig. 7 is a sectional view on the line 7—7 of Fig. 5;

Fig. 8 is a sectional view on the line 8—8 of Fig. 6;

Fig. 9 is an elevation of the locking plate; and

Fig. 10 is a view showing the elements of the gearing detached from each other.

This invention is designed to guard a key-hole 10 of any kind of lock, as for example, the lock 11. The character of the lock is not material but the invention is particularly adapted for automobile locks. By means of screws 12 or the like, a casing 13 is secured over the key-hole 10. This casing is provided with an inner front wall 14 having a passage 15 therethrough, of non-circular shape. I have shown this passage as of key stone shape, but any other shape except circular can be used. In fact, even a circular shape can be used if arranged eccentrically.

The casing is also provided with an outer extension 16 preferably circular in form and having what I call an exterior wall 17 which also is provided with a non-circular perforation 18. This could be of the same shape as the passage 15 if desired, or any other shape that is non-circular or eccentric, but I have shown it as being of a general circular form with notches 19. Outside this wall 17 is a circular recess in which is located a ring 20 on which is mounted another ring 21 in fixed position, but preferably circumferentially adjustable. This ring is provided with a scale 22 which need not extend throughout the circumference or with a zero point. In an under-cut groove 24 within this ring is a rotatable ring 23 having a circular scale preferably extending throughout its circumference, and held in place by means of a circular flange 23$^a$, entering the under-cut groove.

This ring 23 is secured by a screw or other key 25 to a rotatable member 26 which may be of any desired shape but shown as substantially hemispherical and formed of solid metal or glass. This member 26 is provided with a projection or projections 27, shown in this instance as consisting of three parts fitting in the notches 19. These three parts as shown, are so arranged that the member 26 can not be pushed back to its seat as shown in Fig. 1, until turned to register properly and can not be removed until turned into the same position, but it is capable of rotating on its own axis, taking with it the ring 23. These projections 27 constitute a non-circular outline of the same shape as the perforation 18 which constitutes a bearing therefor.

At the center of the member 26 it is provided with a shaft 30 headed at one end and centrally screwed into the member 26 at the other. On this shaft is keyed a gear 31 meshing with a smaller gear 32 which is mounted on a bushing 33 rotatable on a shaft 34 screwed into the wall 14. These parts are located in a depression in the rear face of this member 26.

Also keyed on the bushing 33 is a larger gear 35 meshing with a smaller gear 36 mounted on a bushing 37 rotatable on the shaft 30. To this bushing 37, is keyed a plate 38. It is shown as of the same shape and size as the passage 15, but at any rate it is so made that the plate 38 can be removed from behind the passage 15 and through it only when it is turned to one position. Its outline is non-circular or eccentric.

It will be obvious that when the member 26 is turned, the plate 38 will be turned by the gearing at a different rate and will make a plurality of complete revolutions and a fraction of a revolution in addition while the member 26 is making one. It will also be obvious that the member 26 can not be removed except when the plate 38 is in a definite position, nor can it be removed except when the projections 27 are in a definite position. Either one of these may be in the right position without the other one registering, and thus a certain combination has to be effected before the protecting member 26 can be removed. To unlock it, the member 26 must be rotated a certain number of times and brought back to its zero or entering position. This is represented by a number on the scale 23 which number must coincide with the zero point or some other specified point on the scale 22 before the lock can be reached by the key. In other words, this device furnishes means by which a combination lock is provided to prevent access to the key-hole of the lock. The mechanism is self-contained, that is removable with the member 26.

Although I have described and illustrated only a single form of my invention, I am aware of the fact that modifications can be made therein by any person skilled in the art without departing from the scope of the invention as expressed in the claims.

Therefore I do not wish to be limited to all the details of construction and combinations of parts herein shown and described, but what I do claim is:—

1. In a key-hole guard, the combination with a casing for covering a key-hole, said casing having a non-circular passage therethrough, and a bearing provided with a non-circular perforation in its outer wall, of a member rotatably mounted in said bearing and having a non-circular projection fitting said perforation and normally located behind said outer wall, whereby it is adapted to be withdrawn through the perforation when located in a certain position, a plate of the same shape as said non-circular passage, carried by said member, and normally located in the casing behind said passage and capable of being withdrawn only when in a certain position or positions, and means for turning said plate when said member is turned, but at a different speed.

2. In a key-hole guard, the combination of a casing adapted to be secured on the front of a lock to cover the key-hole, said casing having a passage therethrough and a bearing outside of the passage having a perforation through its outer wall, a member for covering said casing and preventing access to the interior thereof, mounted to rotate in said bearing and having a fixed projection of a shape to permit it to be inserted and withdrawn only when turned to a certain position with respect to the perforation in the wall of said bearing, a shaft centrally carried by said member and fixed thereto and projecting through said perforation and passage, a plate rotatably mounted on said shaft beyond said passage inside and so shaped and located with respect to said passage as to be capable of being inserted and withdrawn only when turned to a certain position, and means whereby the rotation of said member will be transmitted to said plate, but at a different speed.

3. In a key-hole guard, the combination of a casing for covering a key-hole having a passage, a rotatable member adapted to cover said passage to prevent access to the interior of the casing, gearing carried by said member on its inner face inside said casing, a locking plate of the same shape as said passage and adapted to be withdrawn therethrough when in a certain position, and means for connecting said plate with said gearing so as to rotate it at a different speed from that of said rotatable member when the latter is rotated.

4. In a key-hole guard, the combination of a casing for covering a key-hole having a non-circular passage, a rotatable member adapted to cover said passage to prevent access to the interior of the casing, gearing carried by said member on its inner face, a locking plate of the same shape as said passage, said plate being connected with said gearing to be rotated thereby at a greater speed than said rotatable member, and means independent of said locking plate whereby said rotatable member can be removed only when rotated to a pre-determined position.

5. In a key-hole guard, the combination of a casing for covering a key-hole having a non-circular passage, a rotatable member adapted to cover said passage to prevent access to the interior of the casing, gearing connected with said member on its inner face, a locking plate of the same shape as said passage, said plate being connected with said gearing to be rotated thereby at a greater speed than said rotatable member, whereby said member can be removed only when rotated to a pre-determined position, a ring carried by said rotatable member and rotatable therewith and having a circular scale thereon, and a second ring fixed in position on the casing and provided with a zero point.

6. In a key-hole guard, the combination with a casing for covering the key-hole, said casing having a non-circular passage therethrough and a bearing provided with a non-circular perforation in its outer wall, of a member rotatably mounted in said bearing and having a non-circular projection fitting said perforation and normally located behind said outer wall, whereby it is adapted to be withdrawn through the perforation when located in a certain position, a plate of the same shape as said non-circular passage carried by said member, and normally located in the casing behind said passage and capable of being withdrawn only when in a certain position with respect thereto, means for turning said plate when said member is turned, but at a different speed, and a circular scale and zero point, one of which is carried with said rotatable member and the other stationary, for showing when said projection is in proper position to permit the removal of said member from the casing, and when the member has been rotated times enough to bring the plate also into registration with said passage.

7. In a key-hole guard, the combination of a casing for covering a key-hole provided with a bearing, a member rotatably mounted in said bearing, and having an inner projection behind the bearing, said bearing having a shape corresponding with said projection to prevent said member from being drawn out through the bearing except when in a pre-determined position, means rotatably carried by said member and rotatable at a different speed for independently preventing the removal of said member except when in a pre-determined position, and a circular scale and zero point, one of which is carried with said rotatable member and the other of which is stationary for showing when said projection is in proper position to permit the removal of said member from the casing.

8. In a key-hole guard, the combination of a casing for covering the key-hole having a passage therethrough, and a bearing, a member rotatably mounted in said bearing and having means whereby it is prevented from being removed from the bearing except when in a pre-determined position, a plate rotatably mounted with respect to said rotatable member and adapted to be withdrawn through said passage, said plate and passage being of such shape and location that the plate can not be drawn out through said passage except when located in a definite position, said plate being located normally behind the passage, means operated by said rotatable member for turning said plate at a different speed from said member when said member is rotated, and a circular scale and zero point, one of which is carried with said rotatable member and the other stationary for showing when said plate is in proper position to permit the removal of said member from the casing.

In testimony whereof I have hereunto affixed my signature.

JOHN G. STOLPE.